Patented Mar. 3, 1936

2,032,442

UNITED STATES PATENT OFFICE 2,032,442

PROCESS FOR THE MANUFACTURE OF BAKED GOODS

Alfred Schultz, New York, and Charles N. Frey, Scarsdale, N. Y., assignors to Standard Brands Incorporated, New York, N. Y., a corporation of Delaware No Drawing. Application December 23, 1933, Serial No. 703,836

12 Claims. (Cl. 99—10)

The invention relates to the manufacture of baked products, and more particularly to a process for the manufacture of bread, rolls, and like products having enhanced characteristics and especially improved crust color.

In the manufacture of baked goods, as bread and rolls, it has been customary to prepare a dough batch containing flour, water, a leavening agent—as yeast, salt, a carbohydrate material, and other ingredients, as milk. As a carbohydrate material the usual practice has been to add cane sugar to the dough batch. This carbohydrate, or cane sugar, provides nutrient for the yeast which in its action produces carbon dioxide. The carbon dioxide thus formed causes a rising of the dough, or as it is frequently spoken of, a leavening action. Attempts have been made to use other carbohydrate materials, such as dextrose or corn syrup, pure maltose, and similar sugars. The use of these sugars was found to be attended by an unsatisfactory development of crust color. While the texture of the loaf, volume, taste, etc., were satisfactory, nevertheless the utilization of such sugars as dextrose is attended by an insufficient depth to the crust color.

It is an object of the invention to provide a process for the manufacture of bread, rolls and like products, having an improved crust color when utilizing cane sugar, and especially a sugar other than cane sugar in the dough batch.

A further object of the invention is to provide a process for increasing the depth of crust color of baked goods, which may be effectively, economically and readily employed both in large and in small bakeries.

Another object of the invention is to provide a process whereby a normal crust color may be developed upon baked goods, as bread and rolls, when using a sugar material other than cane sugar in the dough batch.

An additional object of the invention is to provide a process for the manufacture of baked goods having a deep brown crust color, which entails contacting the outer part and particularly the top of the dough, that is the crust forming portion, with an ammonium compound which liberates ammonia under the influence of heat, during the baking step.

Other objects of the invention will in part be obvious and will in part appear hereinafter.

The invention accordingly comprises the several steps and the relation of one or more of such steps with respect to each of the others thereof, which will be exemplified in the process hereinafter disclosed, and the scope of the invention will be indicated in the claims.

The practice of the invention may be effected by preparing a dough batch containing the customary materials, as flour, water, yeast, salt and sugar, allowing the dough to undergo fermentation in the usual manner, and forming the fermented dough into shaped articles ready for baking. The baking of the dough is carried out in an oven in the ordinary manner but during the baking period the outer surface especially the top of the dough is contacted with an ammonium compound which liberates ammonia under the influence of heat. The contacting of the top, or crust portion of the dough during the baking operation brings about certain reactions not altogether known whereby the depth of the crust color is improved even though the carbohydrate material used is one other than cane sugar. This contacting of the top of the dough may be brought about in various ways. Preferably, it is contemplated to establish this contact by moistening the top of the dough with a solution containing an ammonium compound which liberates ammonia under the influence of heat, or to introduce such compound into the oven along with the steam. The moistening of the top of the dough may take place by applying with a sponge, cloth, brush, etc., or by spraying, or by dipping. The introduction along with steam may be effected by a separate inlet or a composite inlet in which the steam will pick up the desired quantity of ammonium compound on its way into the oven.

A number of ammonium compounds may be employed and particularly efficacious are those which readily decompose under the influence of heat with the liberation of ammonia. Specifically, mention may be made of the following—ammonium hydroxide, ammonium tartrate, ammonium carbonates, including the normal, bi-, sesqui- and the carbonate-carbamate, ammonium malonate, etc. It will be understood that ammonia is included in the foregoing outline of suitable materials.

As an illustrative embodiment of the manner in which the invention may be practiced, the following examples are presented:

Example I

A dough batch is prepared containing flour, water, yeast, and other dough ingredients, permitted to undergo fermentation, and shaped preparatory to baking. The top of the shaped dough so prepared may then be moistened with a solution of ammonium hydroxide. The solution of ammonium hydroxide may have a strength of 0.1N and the application may be made by brushing the solution onto the top of the dough. The dough thus moistened is introduced into the oven and baked in accordance with the usual procedure.

Example II

A dough batch may be prepared and shaped as outlined in Example I. The shaped dough is then moistened with a solution containing ammonium bicarbonate. The moistening may be carried out by spraying the top of the dough with an ammonium bicarbonate solution having a strength of about .3N. Following the moistening of the dough, it is placed in the oven and baked.

*Example III*

A dough batch is prepared and shaped into desired forms, as outlined in Example I. The batch so prepared and shaped, after proofing, is introduced into the oven and baked with addition of ammonia to the steam introduced during the baking period. The top of the dough is thus contacted with ammonia and improvement in crust color ensues. The ammonia may be added to the steam either as gaseous ammonia from a cylinder containing the same, or the steam may be caused to pass through a solution of ammonia, as ammonium hydroxide, or a solution containing ammonia, or an ammonium compound may be introduced into the steam just prior to its introduction into the oven. The amount of ammonia introduced with the steam may be varied. Satisfactory results have been obtained by the presence of approximately 4% ammonia per cubic foot of oven capacity.

The foregoing procedures provide a manner in which the crust color of baked goods may be improved or deepened. It entails a contacting of the dough during the baking period with an ammonium compound which liberates ammonia under the influence of heat, and especially ammonia. It will be realized that the invention in its broad scope is not limited to the specific materials, concentrations, and conditions set forth in the foregoing illustrative examples. The ammonium compound is of the character of those specifically referred to hereinabove, and the concentration may vary in solution from a normality of 0.05N to 1.0N. The concentration preferably is about 0.1N. If desired, concentrations greater than those particularly referred to may be utilized but when higher concentrations are used considerable care must be exercised so that the top or crust of the loaf is not otherwise impaired. The process is applicable to the production of baked goods of all qualities where it is desired to have the crust of a deep or dark brown color. Further, it is applicable to the production of baked goods whether the leavening action is brought about by yeast or by a chemical leavening agent. The baked goods manufactured in accordance with the invention have good color, texture, taste, and the other qualities present in such goods as usually merchandised.

Since certain changes may be made in carrying out the above process without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent, is:

1. A process for improving the crust color of baked goods which comprises preparing a dough batch, and contacting the dough during the baking period with an ammonium compound which liberates ammonia under the influence of heat.

2. A process for improving the crust color of baked goods which comprises preparing a dough batch, and contacting the dough during the baking period with a solution of an ammonium compound which liberates ammonia under the influence of heat.

3. A process for improving the crust color of baked goods which comprises preparing a dough batch, and contacting the top of the dough during the baking period with an ammonia compound which liberates ammonia under the influence of heat.

4. A process for improving the crust color of baked goods which comprises preparing a dough batch, and contacting the top of the dough during the baking period with a solution of an ammonium compound which liberates ammonia under the influence of heat.

5. A process for improving the crust color of baked goods which comprises preparing a dough batch, and contacting the top of the dough during the baking period with ammonia.

6. A process for improving the crust color of baked goods which comprises preparing a dough batch, and conducting the baking of the dough in an atmosphere containing ammonia.

7. A process for improving the crust color of baked goods which comprises preparing a dough batch, forming the dough into desired shapes, and contacting the top of the shaped dough during the baking period with an ammonium compound which liberates ammonia under the influence of heat.

8. A process for improving the crust color of baked goods which comprises preparing a dough batch, forming the dough into desired shapes, and contacting the top of the shaped dough during the baking period with ammonia.

9. A process for improving the crust color of baked goods which comprises preparing a dough batch, forming the dough into desired shapes, moistening the shaped dough with a solution containing an ammonium compound which liberates ammonia under the influence of heat, and then baking.

10. A process for improving the crust color of baked goods which comprises preparing a dough batch, forming the dough into desired shapes, moistening the top of the shaped dough with a solution containing an ammonium compound which liberates ammonia under the influence of heat, and then baking.

11. A process for improving the crust color of baked goods which comprises preparing a dough batch, forming the dough into desired shapes, moistening the top of the shaped dough with ammonium hydroxide, and then baking.

12. A process for improving the crust color of baked goods which comprises preparing a dough batch, forming the dough into desired shapes, moistening the top of the shaped dough with ammonium hydroxide of about 0.1N strength, and then baking.

ALFRED SCHULTZ.
CHARLES N. FREY.